US011886011B2

(12) United States Patent
Liberale et al.

(10) Patent No.: US 11,886,011 B2
(45) Date of Patent: Jan. 30, 2024

(54) OPTICAL MICROSTRUCTURE FOR FIBER OPTICAL TWEEZERS

(71) Applicant: KING ABDULLAH UNIVERSITY OF SCIENCE AND TECHNOLOGY, Thuwal (SA)

(72) Inventors: Carlo Liberale, Thuwal (SA); Andrea Bertoncini, Thuwal (SA); Innem Venkata Anudeep Kumar Reddy, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 433 days.

(21) Appl. No.: 17/319,441

(22) Filed: May 13, 2021

(65) Prior Publication Data

US 2021/0364700 A1 Nov. 25, 2021

Related U.S. Application Data

(60) Provisional application No. 63/027,497, filed on May 20, 2020.

(51) Int. Cl.
*G02B 6/26* (2006.01)
*F21V 8/00* (2006.01)
(Continued)

(52) U.S. Cl.
CPC .......... *G02B 6/262* (2013.01); *G02B 6/0046* (2013.01); *G02B 21/32* (2013.01); *G21K 1/006* (2013.01)

(58) Field of Classification Search
CPC ...... G02B 6/262; G02B 6/0046; G02B 21/32; G02B 6/241; G02B 6/3624; G21K 1/006; B82Y 20/00
See application file for complete search history.

(56) References Cited

U.S. PATENT DOCUMENTS 8,571,365 B2 * 10/2013 Mohanty ................ C12M 35/02
385/38
2009/0289180 A1 * 11/2009 Cristiani .................. G21K 1/00
250/251

(Continued)

OTHER PUBLICATIONS

Ashkin, A., "Acceleration and Trapping of Particles by Radiation Pressure," Physical Review Letters, vol. 24, No. 4, Jan. 26, 1970, pp. 156-159.

(Continued)

*Primary Examiner* — David A Vanore
(74) *Attorney, Agent, or Firm* — PATENT PORTFOLIO BUILDERS PLLC

(57) ABSTRACT

An optical microstructure is configured to work with an optical fiber or a different substrate and the optical microstructure includes a beam converter including a tapered optical guide configured to transform a gaussian optical beam into a first annular optical beam; an inverted cone having first and second reflection surfaces, each configured to reflect the first annular optical beam, having a radius R1, so that a resulting second annular optical beam has a radius R2 larger than the radius R1; and a prism having a reflection surface configured to reflect the second annular optical beam to form a third converging annular optical beam. The third converging annular optical beam includes plural single optical beams that intersect at a given crossing point, outside the optical microstructure. The plural single optical beams form an optical trap.

20 Claims, 14 Drawing Sheets

(51) Int. Cl.
G21K 1/00 (2006.01)
G02B 21/32 (2006.01)

(56) References Cited

U.S. PATENT DOCUMENTS

2010/0120113 A1* 5/2010 Mohanty ............... G02B 21/32
385/33
2021/0364700 A1* 11/2021 Liberale ............... G02B 6/0046

OTHER PUBLICATIONS

Huntington, S.T., et al., "A fractal-based fibre for ultra-high throughput optical probes," Optics Express, vol. 15, No. 5, Mar. 5, 2007, pp. 2468-2475.
Liberale, C., et al., "Integrated microfluidic device for single-cell trapping and spectroscopy," Scientific Reports, vol. 3, Feb. 13, 2013, pp. 1-6 (7 pages total).
Liberale, C., et al., "Miniaturized all-fibre probe for three-dimensional optical trapping and manipulation," Nature Photonics, vol. 1, Dec. 2007 (Published online Nov. 25, 2007), pp. 723-727.
Liu, Z., et al., "Tapered fiber optical tweezers for microscopic particle trapping: fabrication and application," Optics Express, vol. 14, No. 25, Dec. 11, 2006, pp. 12510-12516.
Yuan, L., et al. "Twin-core fiber optical tweezers," Optics Express, vol. 16, No. 7, Mar. 31, 2008 (Published Mar. 18, 2008), pp. 4559-4566.
Zhang, Y., et al., "A non-contact single optical fiber multi-optical tweezers probe: Design and fabrication," Optics Communications, vol. 285, 2012 (Available online Jun. 30, 2012), pp. 4068-4071.
Zhang, Y., et al., "Four-Core Optical Fiber Micro-Hand," Journal of Lightwave Technology, vol. 30, No. 10, May 15, 2012 (Date of Publication Feb. 13, 2012; date of current version Apr. 4, 2012), pp. 1487-1491.
Zhao, X., et al., "Optical Fiber Tweezers: A Versatile Tool for Optical Trapping and Manipulation," Micromachines, vol. 11, 2020 (Published Jan. 21, 2020), pp. 1-27.

* cited by examiner

OPTICAL MICROSTRUCTURE FOR FIBER OPTICAL TWEEZERS

CROSS-REFERENCE TO RELATED APPLICATIONS

This application claims priority to U.S. Provisional Patent Application No. 63/027,497, filed on May 20, 2020, entitled "3D PRINTED MICROSTRUCTURE TO CREATE OPTICAL FIBER TWEEZERS," the disclosure of which is incorporated herein by reference in its entirety.

BACKGROUND

Technical Field

Embodiments of the subject matter disclosed herein generally relate to an optical fiber that is transformed to act as a fiber optical tweezers, and more particularly, to an optical microstructure, which can be 3D printed, that can be attached to and/or printed on a tip of the optical fiber to transform the optical fiber into the fiber optical tweezers.

Discussion of the Background

Optical tweezers are a contact-less tool that allows to trap and manipulate a variety of microscopic objects with a broad range of dimensions, for example, from single atoms to 100 micron size. The optical tweezers and their application to biological systems was recently recognized as a major advancement in science, when the Nobel Prize in 2018 was awarded to the inventor of the optical tweezers, Arthur Ashkin [1]. Optical Tweezers (OT) are extensively applied in bioscience, since they can be used to study small entities like viruses, bacteria, and DNA, in a contact-less and non-destructive way. Moreover, optical tweezers allow measuring tiny forces, down to fN, which are the typical magnitude of molecular interaction forces in the biological systems.

The conventional optical tweezers setup is based on an optical microscope in which a laser beam is expanded and directed to a high Numerical Aperture (NA) objective, which sharply focuses it to create a high beam intensity gradient into the medium where the microscopic object has to be trapped. This implementation creates a constraint between the trapping position and the field of view of the microscope cameras, which is typically small for high-NA objectives. Also, high-NA objectives have typically small working distances. The manipulation capabilities, i.e., the ability to change the 3D position of the trapped microscopic particle, are often provided by beam shaping or steering devices, such as Spatial Light Modulators (SLM) or Galvanometric scanners. Therefore, such a system has restricted degrees of freedom on the type of sample and on the movement of the sample and is also bulky and expensive.

Optical tweezers based on single fiber optics (fiber optical tweezers—FOT) offer a miniaturized solution for optical trapping and can potentially expand its range of applications. FOT allow to trap objects in thick or turbid media—which is challenging or impossible with high-NA microscope objectives—and provide direct manipulation of the trapped object by simply moving the optical fiber. However, the beam output from a standard single-mode optical fiber is a divergent Gaussian beam that cannot create a stable optical trap. Therefore, FOT are created by modifying the standard optical fibers or with specialty optical fibers. In the first case, standard optical fibers are modified, typically by tapering their end part to create a small tip, and the obtained FOT has very short working distances for trapping, so that they are in-fact "contact" fiber tweezers [2-4] since the trapped object is often touching the fiber probe. Non-contact optical tweezers [5-7] can only be created by modifying specialty optical fibers, typically featuring an annular core, which allows to increase the working distance while maintaining the necessary trapping efficiency [8]. Both approaches are plagued by shortcomings, as the standard optical fiber based FOT are limited in range and technical capabilities while the specialty optical fiber based FOT are complex to manufacture.

Thus, there is a need for new FOT that overcome the above-noted problems, are inexpensive, are easily accessible, and can be adapted to various needs.

BRIEF SUMMARY OF THE INVENTION

According to an embodiment, there is an optical microstructure configured to work with an optical fiber or a different substrate. The optical microstructure includes a beam converter including a tapered optical guide configured to transform a gaussian optical beam into a first annular optical beam, an inverted cone having first and second reflection surfaces, each configured to reflect the first annular optical beam, having a radius R1, so that a resulting second annular optical beam has a radius R2 larger than the radius R1, and a prism having a reflection surface configured to reflect the second annular optical beam to form a third converging annular optical beam. The third converging annular optical beam includes plural single optical beams that intersect at a given crossing point, outside the optical microstructure. The plural single optical beams form an optical trap.

According to another embodiment, an optical microstructure that is configured to work with an optical fiber or a different substrate, includes a beam converter including a tapered optical guide configured to transform a gaussian optical beam into a first annular optical beam, and an inverted cone having first and second reflection surfaces, each configured to reflect the first annular optical beam, having a radius R1, so that a resulting second annular optical beam has a radius R2 larger than the radius R1. The second annular optical beam includes plural single optical beams that intersect at a given crossing point, outside the optical microstructure. The plural single optical beams form an optical trap.

According to still another embodiment, there is a fiber optical tweezers for manipulating one or more particles, and the fiber optical tweezers include an optical fiber having an end that outputs a gaussian optical beam, and an optical microstructure attached to the end of the optical fiber and configured to receive the gaussian optical beam and generate plural single individual optical beams that act as tweezers. The optical microstructure includes a beam converter that transforms the gaussian optical beam into a first annular optical beam, an inverted cone that increase a radius of the first annular optical beam to form a second annular optical beam, and a prism that transforms the second annular optical beam into a third converging annular optical beam. The third converging annular optical beam includes the plural single optical beams that intersect at a given crossing point, outside the optical microstructure. The plural single optical beams form an optical trap.

According to yet another embodiment, there is a method for printing an optical microstructure on an end of an optical fiber for forming a fiber optical tweezers. The method includes printing on the end of the optical fiber, a beam converter including a tapered optical guide configured to transform a gaussian optical beam into a first annular optical beam, printing on the beam converter, an inverted cone having first and second reflection surfaces, each configured to reflect the first annular optical beam, having a radius R1, so that a resulting second annular optical beam has a radius R2 larger than the radius R1, and printing on the inverted cone, a prism having a reflection surface configured to reflect the second annular optical beam to form a third converging annular optical beam. The third converging annular optical beam includes plural single optical beams that intersect at a given crossing point, outside the optical microstructure. The plural single optical beams form an optical trapping.

BRIEF DESCRIPTION OF THE DRAWINGS

For a more complete understanding of the present invention, reference is now made to the following descriptions taken in conjunction with the accompanying drawings, in which:

FIG. 9A illustrates another modified optical microstructure that does not use a prism region while

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a 3D printed optical microstructure that is attached to or printed on a tip of a standard optical fiber for transforming the optical fiber into a fiber optical tweezer. However, the embodiments to be discussed next are not limited to a 3D printed optical microstructure that transforms an optical fiber into a fiber optical tweezers, but they may be applied to an optical microstructure that is manufactured by methods different from printing and they may be applied to other optical systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an optical microstructure, which can be 3D printed directly on an end-face of a standard single-mode (or multimode) optical fiber, is configured to create a long working distance optical trap. Some geometrical parameters of this microstructure can be modified to obtain different trapping working distances and trapping efficiencies. This microstructure may include two or three functional regions, with each region having a specific function in the optical beam transformation. These regions may be made as a single piece, i.e., the optical microstructure, or they may be made independent and separate from each other, and then they can be connected to each other to obtain the optical microstructure. While the optical microstructure can be formed directly on the tip of the optical fiber, in one embodiment it is possible to make the optical microstructure independent of the optical fiber and then to attach it to the optical fiber. The optical microstructure may be attached to other optical elements if desired.

Figure 1:
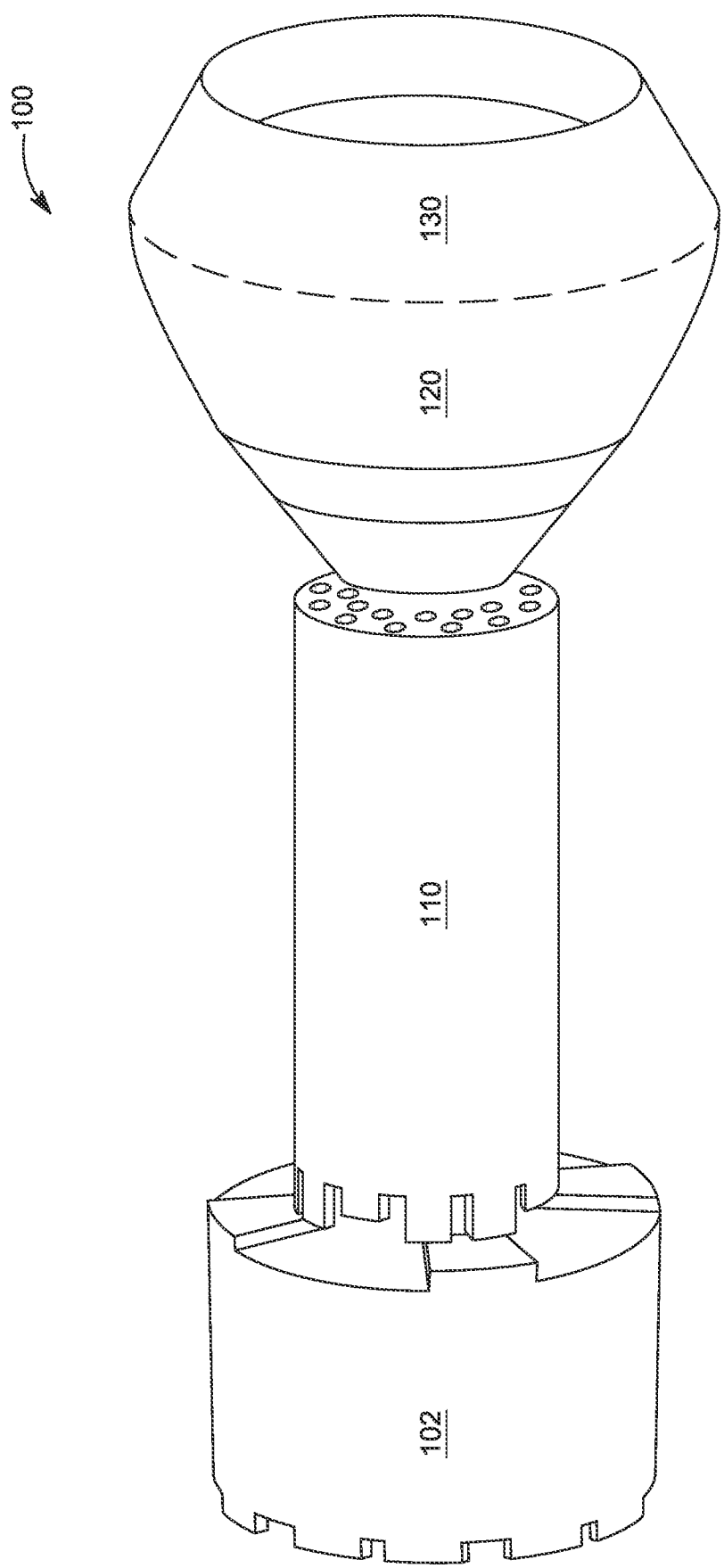
FIG. 1 is a schematic diagram of a fiber optic tweezers that uses an optical microstructure attached/printed to an end of a standard optical fiber.

More specifically, according to the embodiment illustrated in FIG. 1, the optical microstructure 100 is connected (either directly formed on or attached with another substance) to an optical fiber 102 or a different substrate. Note that a diameter of the optical fiber 102 may be about 125 µm. A length of the microstructure 100 may be around 300 µm, or less, and a diameter of the microstructure may be less than a diameter of the optical fiber, for example 116 µm. While the microstructure 100 can be manufactured with various methods, the one shown in FIG. 1 has been 3D printed with a commercial two-photon lithography system using a material IF-Dip (Nanoscribe). The microstructure 100 shown in the figure has been 3D printed to be an integral single part. However, the microstructure 100 has three regions 110, 120, and 130 that have specific functionalities and characteristics for achieving the fiber optical tweezers. These regions are now discussed in turn, with each region being presented without the other regions for a better understanding. However, those skilled in the art should understand that the three regions can be made separately or integrally as the microstructure 100, without affecting the functionality of each region.

Figure 2A:
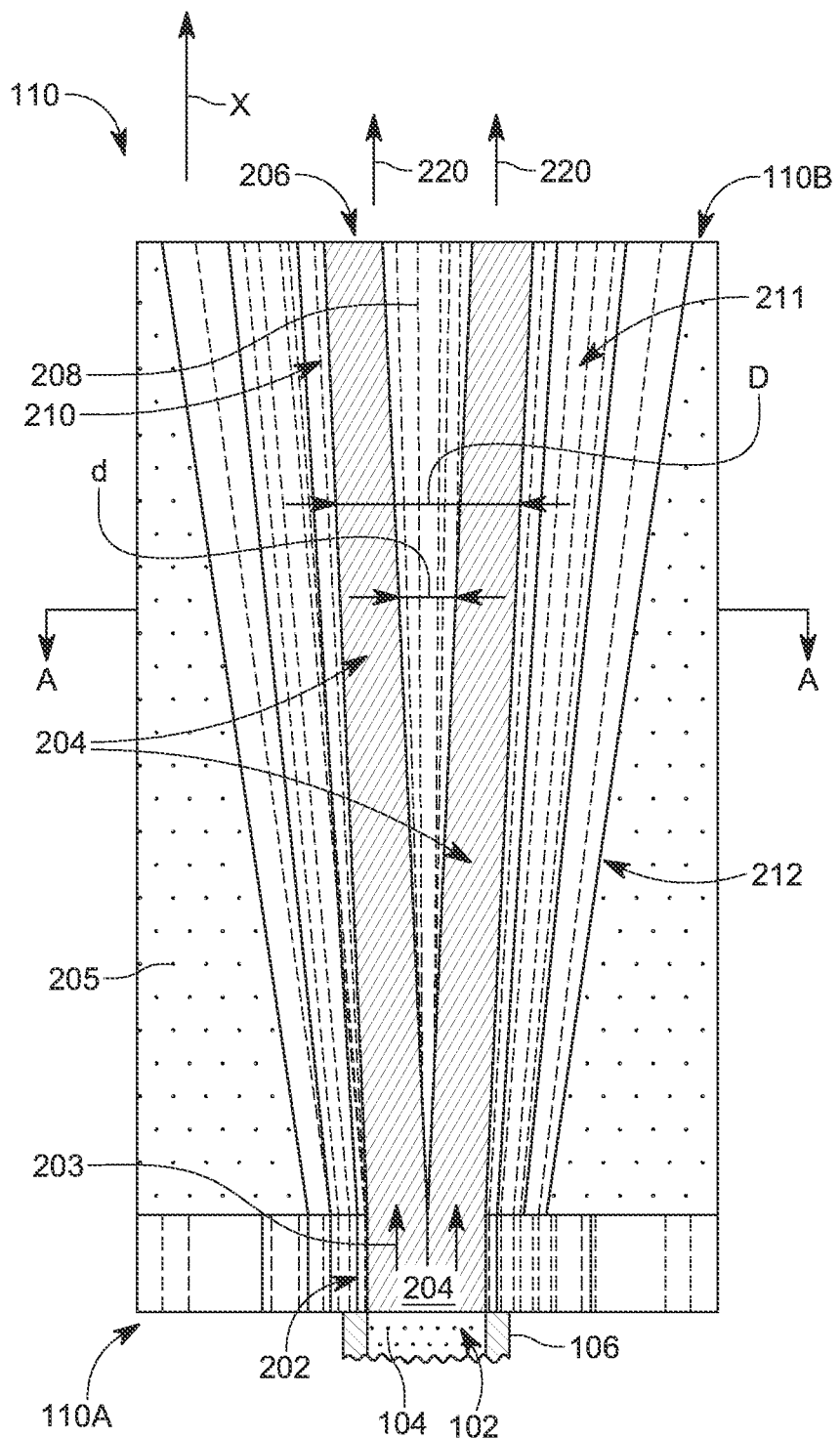
FIGS. 2A to 2D illustrate a beam converter region of the optical microstructure and the various elements that form the beam converter region.

The first region 110 is configured to act as a Gaussian to annular (GTA) beam converter. In one implementation, as illustrated in FIGS. 2A to 2D, the first region or GTA beam converter 110 is implemented as a tapered optical waveguide 204 with a photonic crystal fiber (PCF) design [9]. More specifically, the GTA beam converter 110 is configured to receive at input 202 the optical beam 203 from the optical fiber 102. Note that the core 104 of the optical fiber 102 is matched in diameter to the input 202 of the beam converter 110. FIG. 2A also shows the cladding 106 formed around the core 104 of the optical fiber 102. The input 202 is optically aligned to the tapered optical waveguide or conduit 204, which extends longitudinally along the length of the beam converter 110. An external diameter D of the conduit 204 is continuously changed so to realize an optical mode shape transformation. Note that the external diameter D of the conduit 204 is smaller than the diameter of the beam converter 110. At the same time, an internal diameter d of the conduit 204 is also continuously changed for the same purpose and smaller than the external diameter D. Thus, the conduit 204 has an annular structure characterized by the internal diameter d and the external diameter D, both of which increase from the input 202 to the output 206, which is located to the opposite end of the beam converter 110, relative to the input 202, as shown in FIG. 2A. The region 208 located inside internal diameter d of the annular conduit 204 may be empty, i.e., no material is deposited in this region, or it may be filed with the same material that is used for the annular conduit, or even with a different material. The annular conduit 204 may be formed of the same material 205 as the core 104 of the optical fiber 102.

Figure 2B:
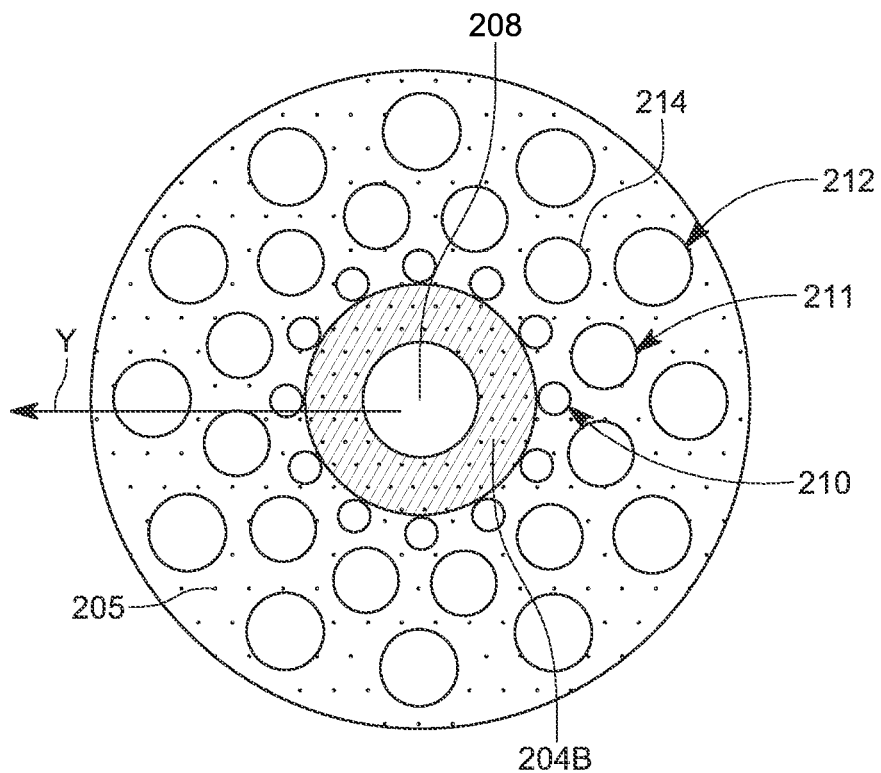
Figure 2C:
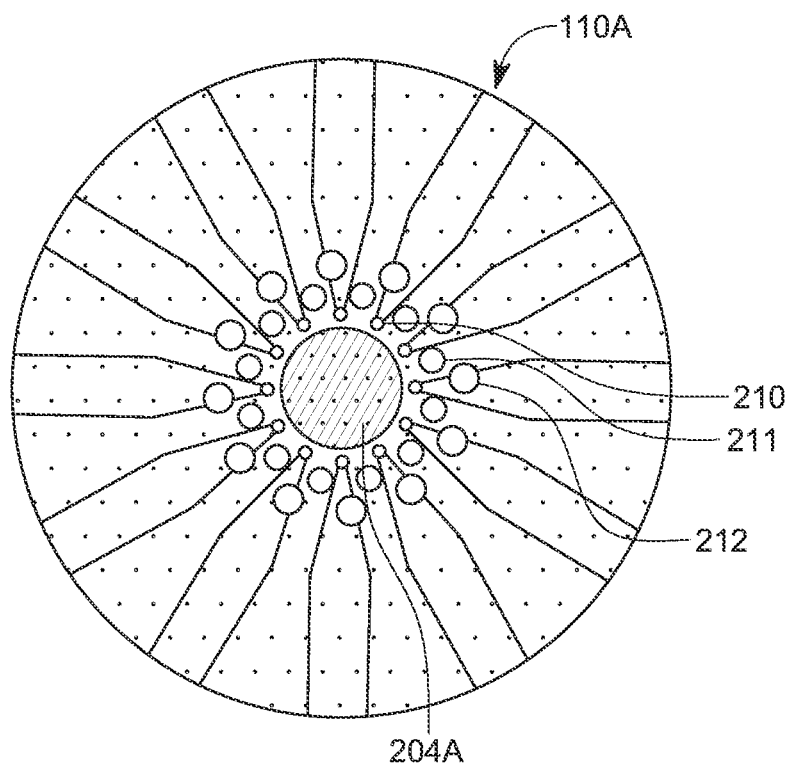

Around the conduit 204, plural sets 210, 211, 212 of empty channels 214 are formed, as shown in FIG. 2B, which is a cross-sectional view of the FIG. 2A at axis AA. Each set 210, 211 and 212 (only three are shown in FIG. 2B, but more or less sets can be used) includes plural empty channels 214 that extend from one end 110A to another end 110B of the beam converter 110. The channels 214 are empty, i.e., no material is present inside them (only air). Thus, the bottom end 110A of the microstructure 100, as illustrated in FIG. 2C, has a central solid core 204A surrounded by a concentric pattern of hollow channels 214. The input core size of the solid core 204A is designed to match the size of the optical mode output from the standard single-mode optical fiber 102. Along the optical path of the optical beam, this central core 204A transforms into an annular core 204B with a hollow center 208, as illustrated in FIG. 2B, which support an annular optical mode. At the same time, the surrounding pattern of hollow channels 214 also scales up, resulting in hollow channels 214 with variable radii along the longitudinal direction X, as illustrated in FIG. 2A. The maximum tapering angle of these channels is such that it does not allow the formation of higher-order optical modes in the annular core 204. This maximum angle dictates the height of the microstructure 100 and the radius of the annular beam 220 that is formed at the end 110B of the microstructure 100. One can achieve annular beams 220 of different diameters by either changing the tapering angle or changing the height of the structure or both. It is noted that because of the plural sets 210, 211, and 212 of hollow channels 214, the input light 203 is confined inside the annular conduit 204 as the light advances along the longitudinal direction X.

Figure 3:
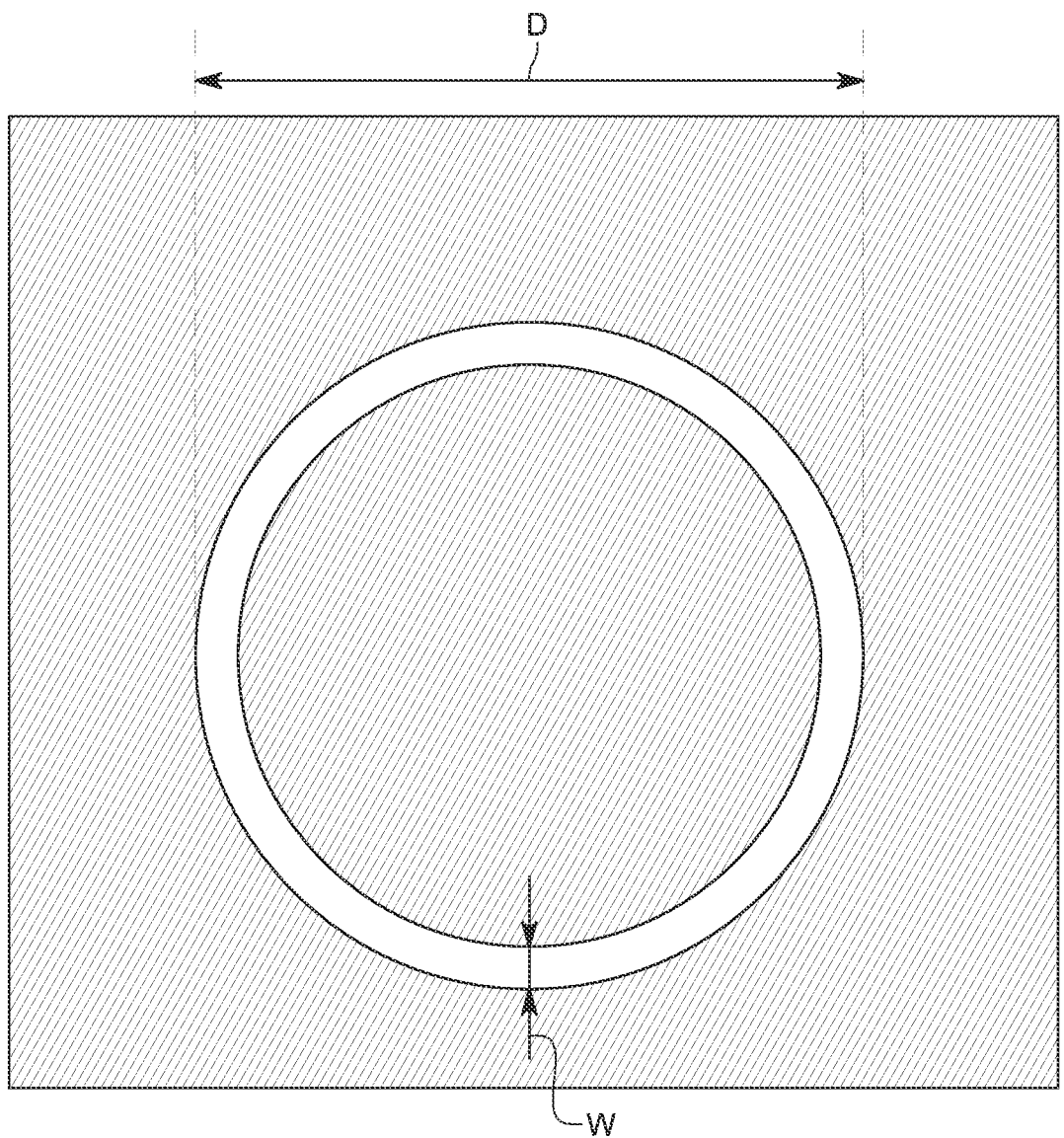
FIG. 3 illustrates the width of the annular optical beam generated by the beam converter region.

The pattern of the hollow channels 214 around the annular core 204 and the radius of the hollow center 208 determine the width W of the annular beam output 220 from the beam converter 110, i.e., the distance between the inner and the outer diameters d and D of the annular mode as shown in FIG. 3. This pattern of empty channels 214 together with the well-aligned gaussian mode from the standard fiber act as a sieve for radial and azimuthal higher-order modes and allows only the desirable uniform annular mode in the core 204. The design of this pattern, as shown in FIGS. 2A to 2C, includes concentric rings of hollow channels 214. In one possible implementation, the radii of the sets 210 to 212 double when moving to successive sets of channels along an outer direction Y (see FIG. 2B). Moreover, the successive patterns of sets (circles) of channels are rotated relative to each other in the transverse plane illustrated in FIG. 2B, by π/n, where n is the number of channels in the previous set. The distance between these concentric sets of channels is calculated to generate the uniform annular mode in the core 204.

Figure 2D:
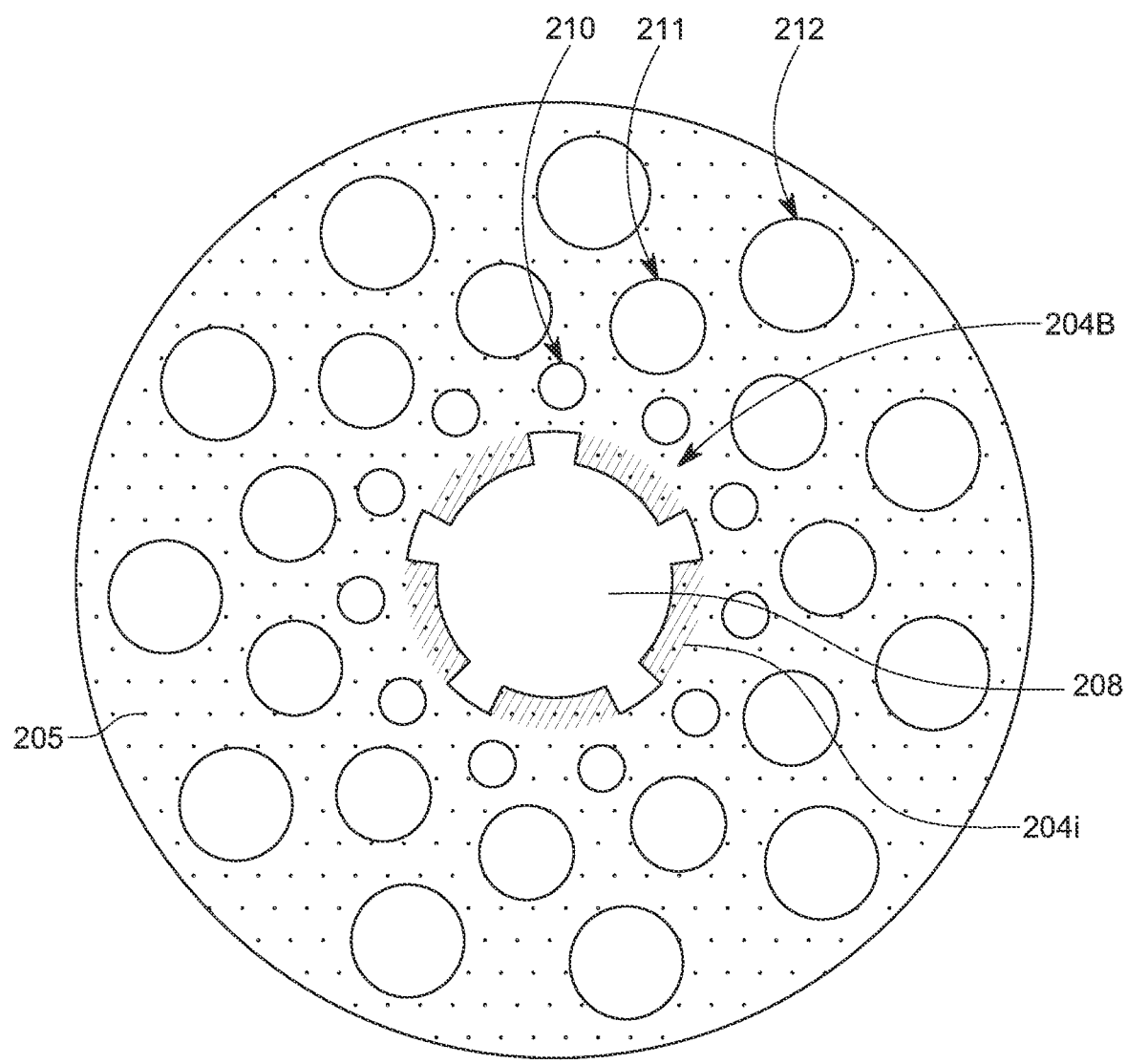

In one embodiment, the beam converter 110 transforms the incoming light beam 203, having a diameter of about 1 µm and being a Gaussian beam, into an annular beam 220 with an inner radius of 4.5 µm and an outer radius of 9 µm. Those skilled in the art would understand that the beam converter 110 can generate annular beams 220 with different radii and widths, depending on the specific needs of the application of the FOT and these parameters can be modified as desired, by changing the sizes of the beam converter 110 and/or the size and location of the patterns of channels 214. Although FIGS. 2B and 2C show the annular core 204 as being a solid, integral part, the annular core 204 may also be formed as a plurality of discrete elements 204i, as illustrated in FIG. 2D. The discrete elements 204i can follow the same shape and structure as the integral annular core 204. Any number of discrete elements may be used.

Figure 4A:
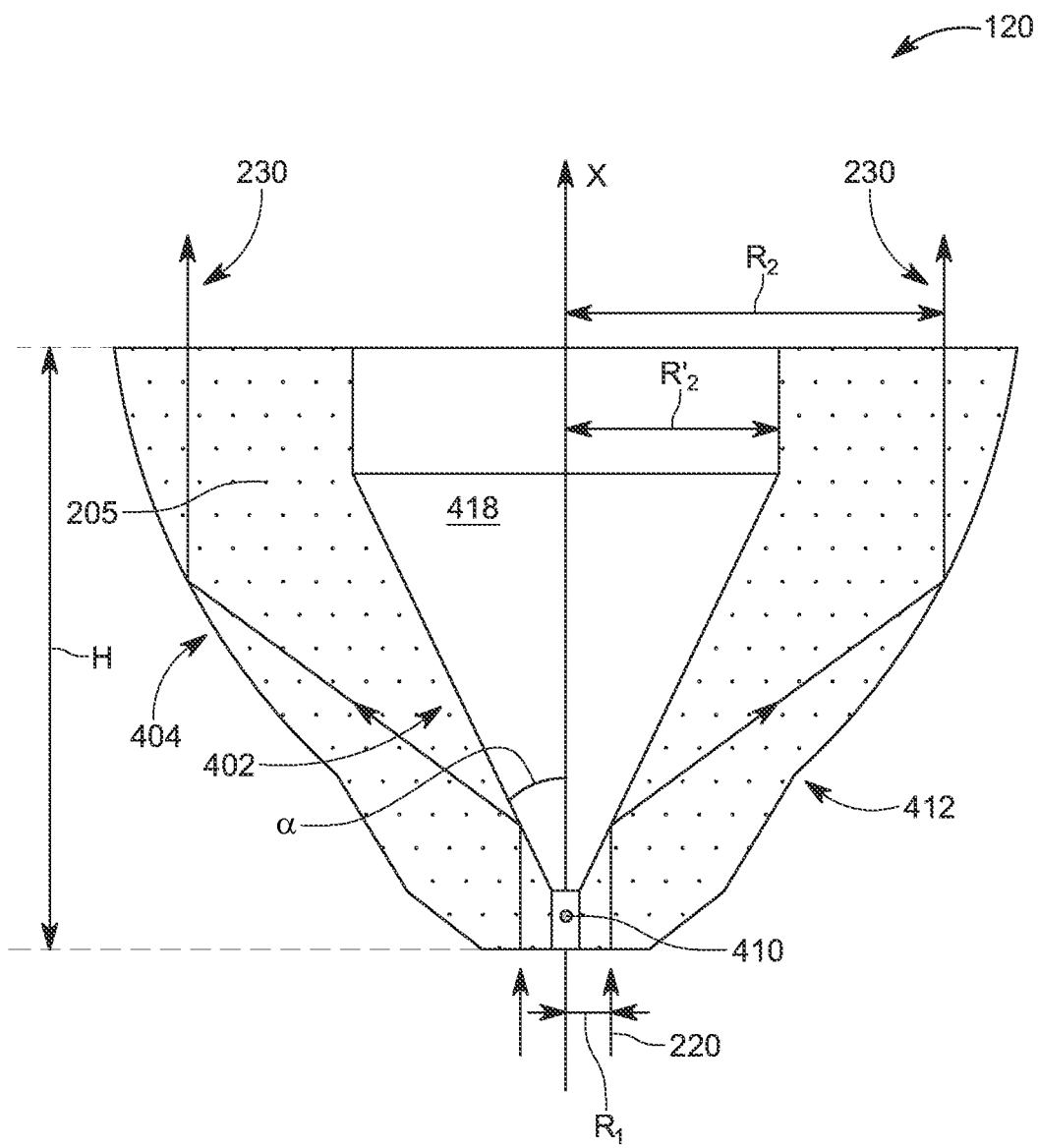
FIGS. 4A to 4C illustrate an inverted cone region of the optical microstructure that increases the radius of the incoming annular optical beam.

The second region 120 of the microstructure 100 has the function of quickly increasing, over a short longitudinal distance, the diameter of the annular beam 220 received from the beam converter 110. This second region is implemented in the embodiment illustrated in FIGS. 4A to 4C as a parabolic inverted cone (PIC). However, the second region 120 may be implemented as a curved inverted cone, where the curved surface can be parabolic or have another curved profile. In this embodiment, the PIC 120 includes a first reflector 402 and a second reflector 404, each of which works on the principle of total internal reflection (TIR). The PIC 120 in this embodiment is axially symmetric, with the line of symmetry passing through the center of the structure and also coinciding with the longitudinal axis X as shown in FIG. 4A. The first reflector 402 has a straight profile, i.e., it is a flat reflector with an inclination angle α relative to the longitudinal axis X greater than the TIR angle for the incoming input annular beam 220. In one embodiment, the incoming annular beam 220 is collimated. The second reflector 404 has in this embodiment a parabolic profile (note that other non-flat profiles may be used, for example, elliptical) and is designed to generate a collimated or focused second annular beam 230, depending on the state of the input annular beam 220, by compensating the divergence of the input first annular beam 220. The collimated second annular beam 230 is shown in FIG. 4A as having an external radius R2 larger than the external radius R1 of the incoming first annular beam 220. The parabolic profile 404 is needed as the use of two straight-line reflectors would result in an undesired diverging annular beam output form the PIC. Alternatively, it is possible to use two reflectors with parabolic profile to achieve the desirable output, i.e., both reflectors 402 and 404 to have the curved profile.

Figure 4B:
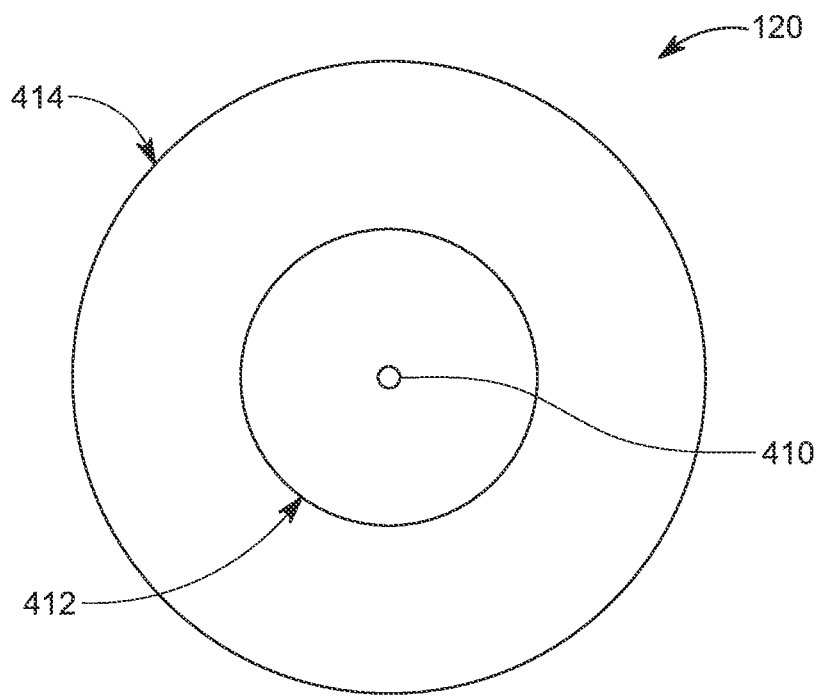
Figure 4C:
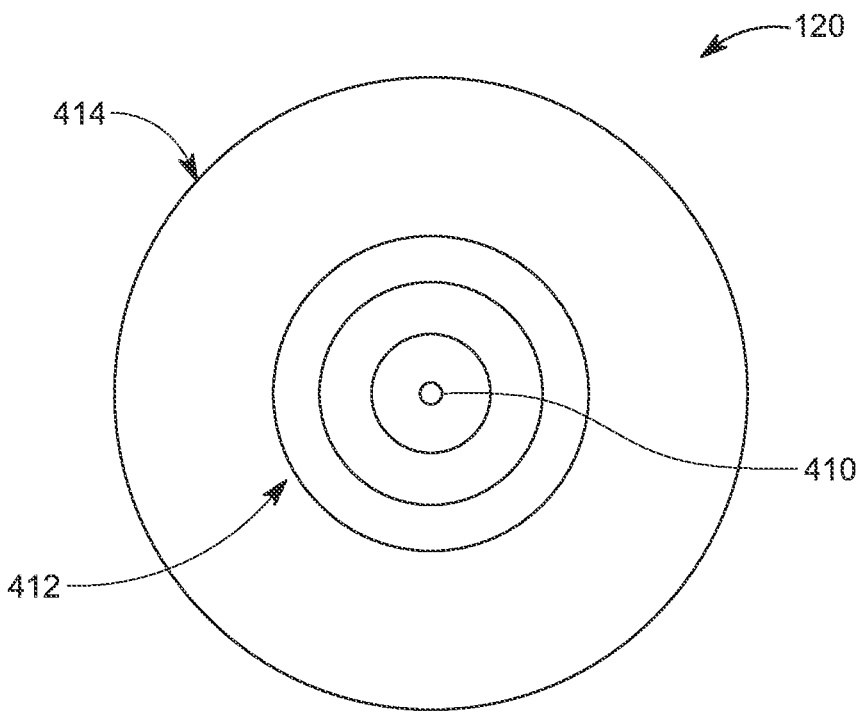

FIG. 4B illustrates a bottom view and FIG. 4C illustrates a top view of the PIC 120. In these figures, an optional hole 410 is shown at the bottom part of the PIC and a first circumference 412, where the curved profile 404 starts, is also indicated. The figures further show the lip 414 of the upper part of the PIC. Note that the volume between the first and second reflectors 402 and 404 may be made of the same material 205 as the optical fiber and the beam converter 110, while the central part 418 of the PIC 120 may be empty, i.e., filed with air, or filled with an immersion liquid, for example, water.

The PIC part 120, if manufactured as a different component from the beam converter 110, may be mounted right on the top of the beam converter 110, as shown in FIG. 1, so that the first annular beam output 220 from the beam converter 110 acts as an input to the PIC 120. The scaled-up second annular beam output 230 from the PIC 120 is uniform, and its external radius R2 can be varied by modifying the PIC's dimensions. The external diameter of the PIC 120 controls the external radius R2. The height H of the PIC 120 depends on the wanted radius R2 for the output second annular beam 230, and can be varied as per the needs of the application. In one application, the height H is 86 μm, which expanded the beam 230 to an inner radius R2' of 47 μm and an outer radius R2 of 57 μm, due to the two total internal reflections happening on the first and second reflectors 402 and 404. Other radii may be obtained.

Figure 5A:
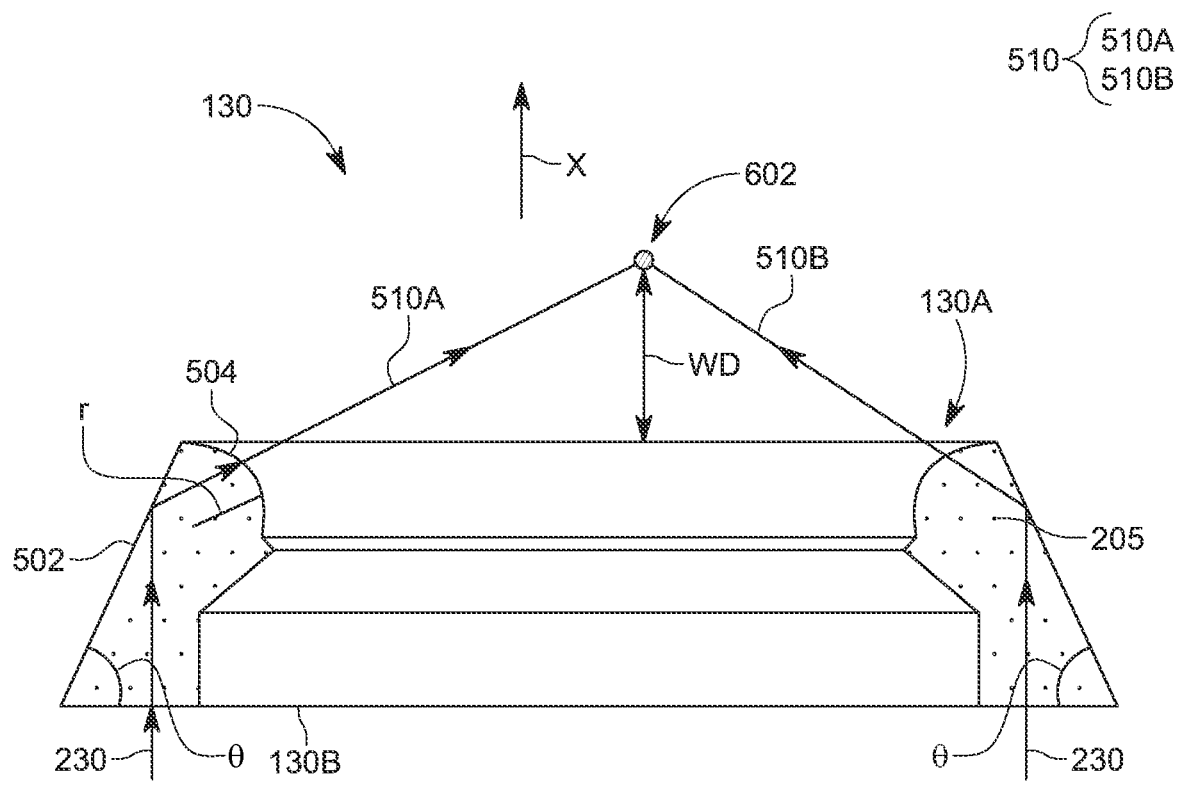
FIGS. 5A and 5B illustrate a prism of the optical microstructure that changes the direction of plural individual optical beams to form an optical trap.
Figure 5B:
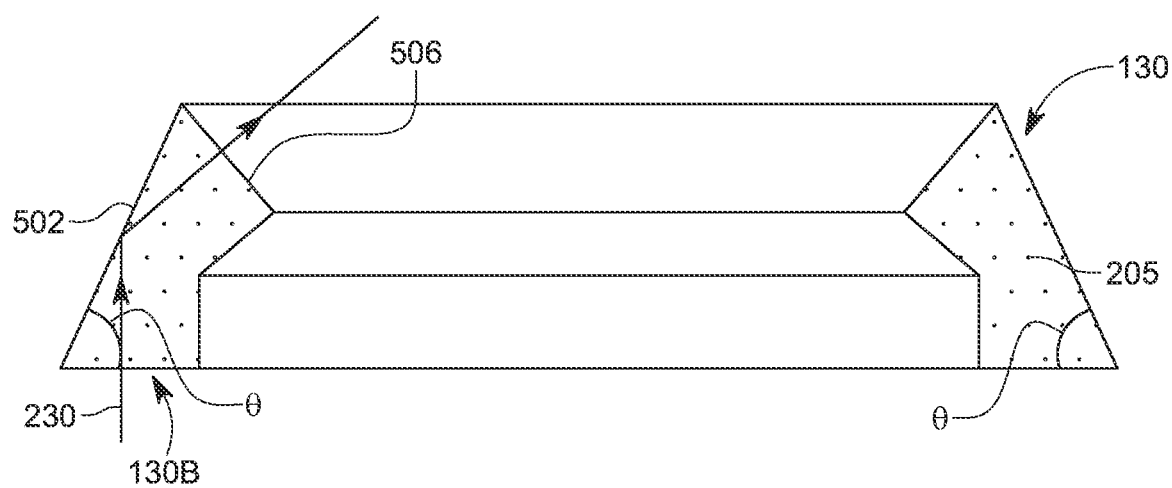
Figure 6:
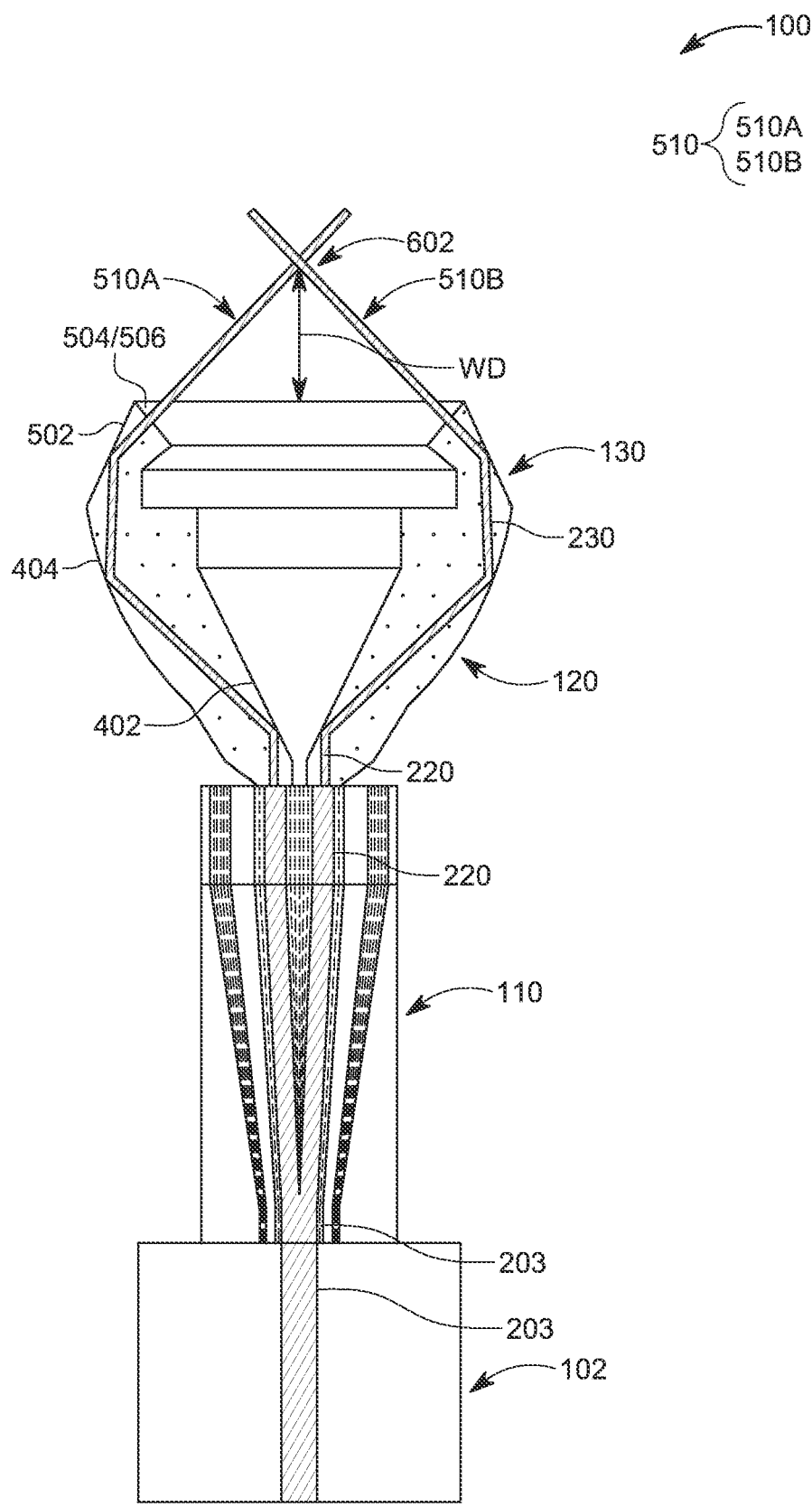
FIG. 6 illustrates the optical path of the incoming gaussian optical beam that propagates through the various parts of the optical microstructure.

The third region 130 of the microstructure 100 is an axi-symmetric prism (AP), which is shown in FIGS. 5A and 5B, and it works on the principle of total internal reflection. The function of the AP structure 130 is to reflect the input second annular beam 230, which is the output from the PIC 120, in such a way to form a third converging annular beam 510, that intersects at a crossing point 602, further away from the microstructure 100, as shown in FIG. 6. The crossing point 602 corresponds to the trapping point for the FOT 100, 102, and is quite distant from the AP 130, allowing for a long working distance, for example, in the order of around 60 μm. The axi-symmetric prism 130 includes, as shown in FIG. 5A, a straight-line reflector 502, that makes an angle θ with the bottom surface 130B of the AP 130. The minimum angle of the prism 8 is selected so that the condition for TIR is fulfilled, as the incoming second annular beam 230 needs to experience a total internal reflection inside the AP 130. The reflecting surface 502 can also have a curved shape, e.g., a parabolic surface, as discussed later.

A top surface 130A of the AP 130 may be terminated with a lens 504, where the lens 504 and the reflection surface 502 are made of the same material 205 as the previous parts. In the embodiment illustrated in FIG. 5B, the top part 130A of the AP 130 is terminated as a regular prism planar surface 506, with no lens.

The output parts 510A and 510B of the reflected third converging annular beam 510 are deviated from the longitudinal axis X to meet at the crossing point 602, away from the top surface 130A of the AP 130, and outside the microstructure 100. Note that the third converging annular beam 510 is shown in FIGS. 5A and 5B as having output parts 510A and 510B, which are nothing else than single individual optical beamlets that do not have an annular structure. All these output parts form the annular optical beam 510. In other words, a part 510A may be a single light ray, plural rays that form a part of the total annular beam 510, or even a half of the annular beam 510.

Note that FIG. 5A shows only two parts 510A and 510B of the output beam 510 while in a practical application there may be many such parts. These parts (which include one or more ray lights) can be uniformly distributed along the circumference of the third converging annular output beam 510 if the original conduit 204 has a continuous circular configuration, as illustrated in FIG. 2B. However, if the conduit 204 has a discrete structure as illustrated in FIG. 2D, then each part 510A, 510B may correspond to a given discrete part 204i of the conduit 204.

The two parameters that define the FOT (which includes the optical fiber 102 and the optical microstructure 100) are its working distance and its equivalent NA. The distance between the top surface 130A of the prism 130, which is the last element of the FOT, and the beam crossing point 602, which is also the trapping point, is the "working distance" WD of the FOT, as illustrated in FIG. 6. The working distance WD is determined by the base angle θ of the reflecting surface 502 of the AP 130 (as this angle increases, the working distance WD increases) and by the radius R2 of the second annular beam 230 output from the PIC 120 (a larger radius corresponds to a longer working distance).

The NA of the FOT is mainly determined by the base angle θ of the AP 130. In this regard, an angle close to the TIR angle results in a high NA, while increasing the angle leads to a low NA. Typically, optical tweezers with a high NA have a greater trapping efficiency, i.e., its range of movement within the trap will be smaller at same optical power, and more external energy has to be provided to the trapped object to set it free from the optical trap. In one application, the AP 130 focuses the annular beam 510 along its radius with a numerical aperture equal to 1 in water immersion. When in water, the output surface 504 may have a radius r of curvature of 7 μm to create a lens with a focal length of 50 μm to focus the third converging annular beam 510 along its thickness. In this embodiment, the overall height of the AP 130 is dependent on the working distance WD and the NA, and the height may be around 24 μm, i.e., between 10 and 30 μm.

In one embodiment, it is possible to configure all the total internal reflection surfaces to work in water immersion, where the critical angle is around 60°. For this configuration, the final result of this cascaded optical microstructure 100 is a sharply focused annular beam 510 which forms an optical trap with a working distance of 30 μm. The microstructure 100 for this specific example is 275 μm long with a diameter of 116 μm, smaller than the single-mode optical fiber which has a diameter of 125 μm.

Another parameter which affects the trapping efficiency of the microstructure 100 is whether the beam 510 is diverging or focused at the crossing point 602. The control of the focusing conditions of the beam 510 is necessary with very long working distances WD, as in this case there is a relatively long path length for the beam, which would cause the beam to be highly expanded by divergence at the crossing point 602. This divergence results in an elongated beam intensity distribution at the crossing point, which decreases the optical forces of the trap, leading to a lower trapping efficiency. Conversely, a focused beam 510 provides a better trapping efficiency, but makes smaller the volume of space in which an object is attracted to the trapping point (this makes it more difficult for the operator of the FOT to trap the particles), so that a trade-off is usually required.

Figure 7A:
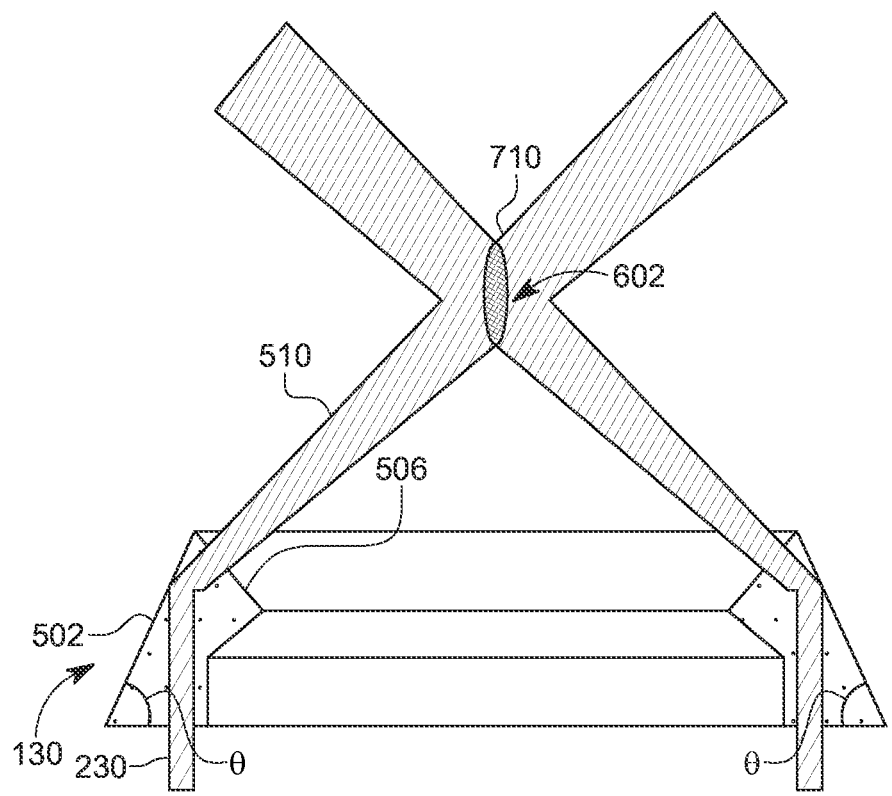
FIGS. 7A and 7B illustrate the focal spot obtained with various implementations of the optical microstructure.
Figure 7B:
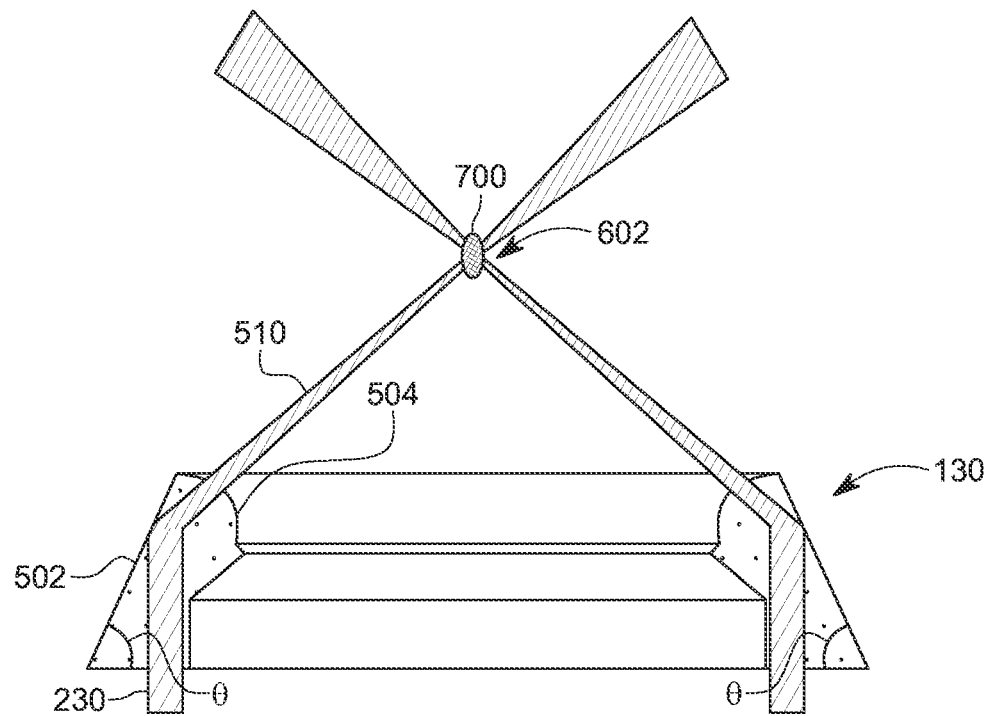

For the microstructure 100, the following options may be used to change the focusing conditions of the beam 510 at the crossing point 602: (1) add the lens surface 504, whose radius of curvature r is calculated from the lens-makers formula, so that a tight focus of the beam 510 is achieved as shown in FIG. 7B, when compared to the beam 510 used with the flat surface 506, which is shown in FIG. 7A. Note that the focal spot 700 for the lens configuration in FIG. 7B is smaller than the focal spot 710 for the configuration without the lens in FIG. 7A. The focal spot corresponds to the optical trap achieved by the plural single individual optical beams 510A, 510B. While the figures show, for simplicity, only two single individual optical beams 510A and 510B, those skilled in the art would understand that many such individual optical beams may be found in the annular optical beam 510.

Figure 8:
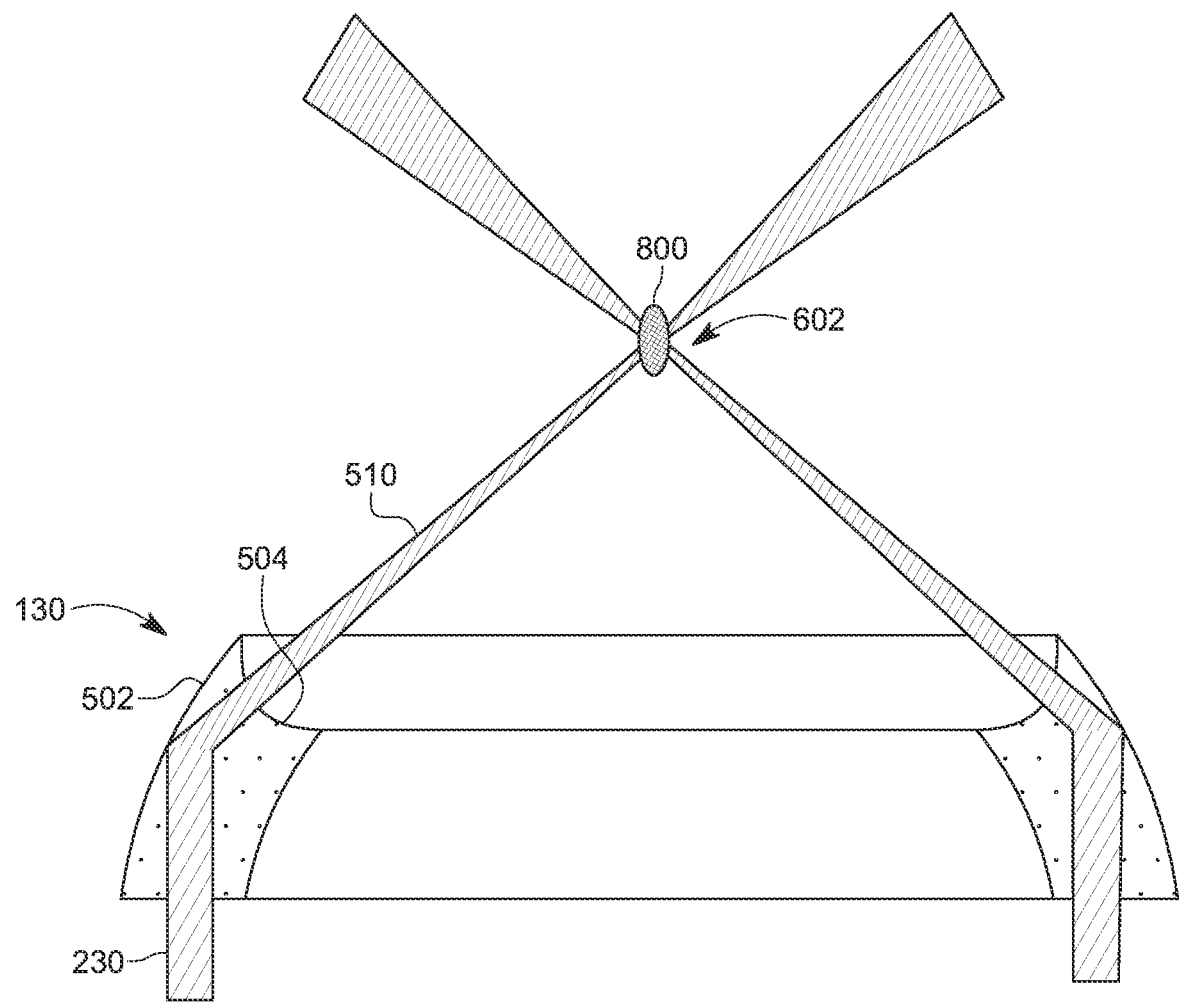
FIG. 8 illustrates a modified optical microstructure for focusing the output optical beams at the focal spot.

A second option (2) is to change the profile of the straight reflecting surface 502 of the AP 130, from a straight profile to a curved profile, e.g., parabolic shape, as shown in FIG. 8, with the focus of the parabola being the beam crossing point 800. In this configuration, the output surface 504 of the prism 130 has preferably a circular profile, centered on the crossing point 602, to avoid deflection by refraction for the beam.

Figure 9A:
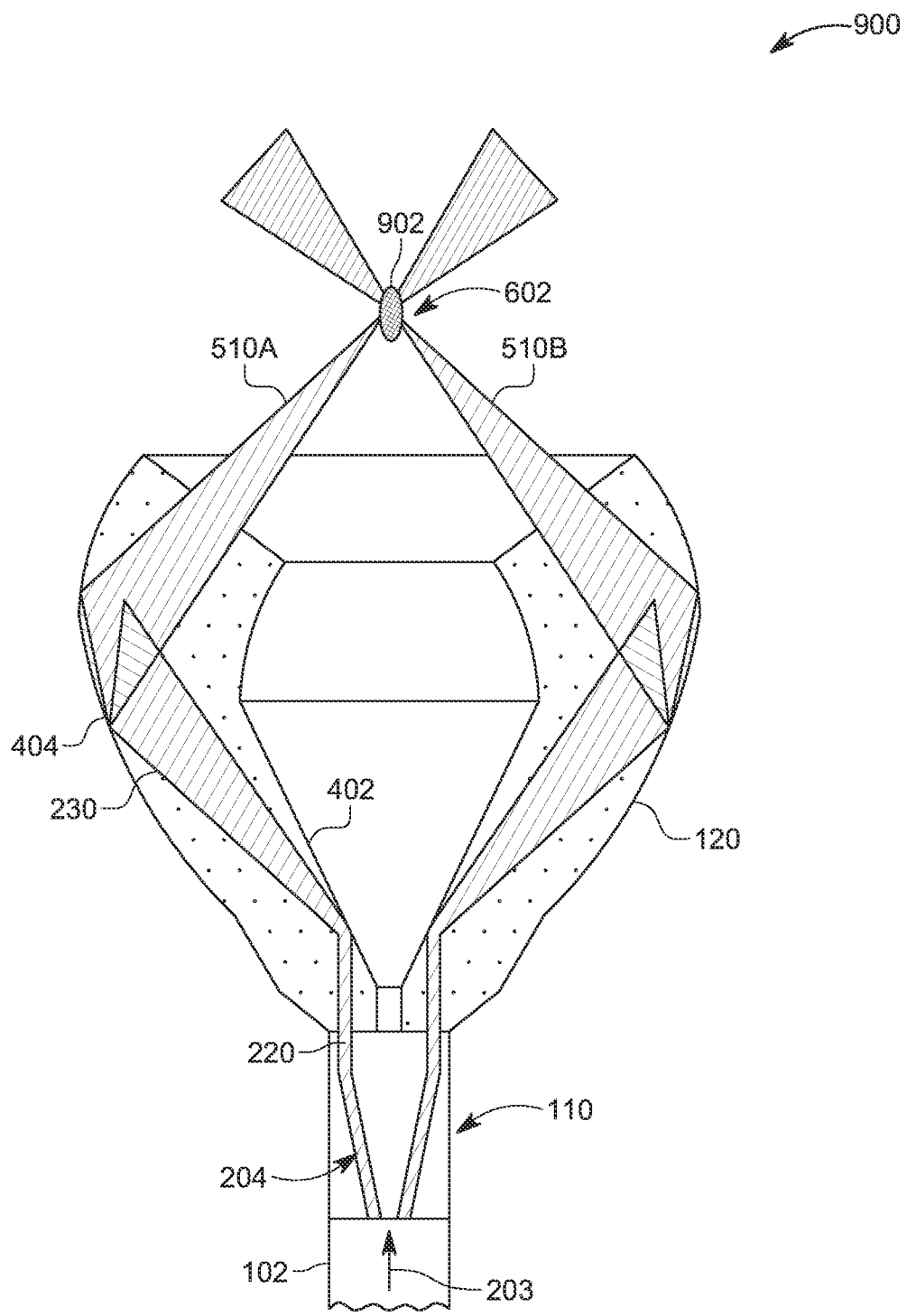
Figure 9B:
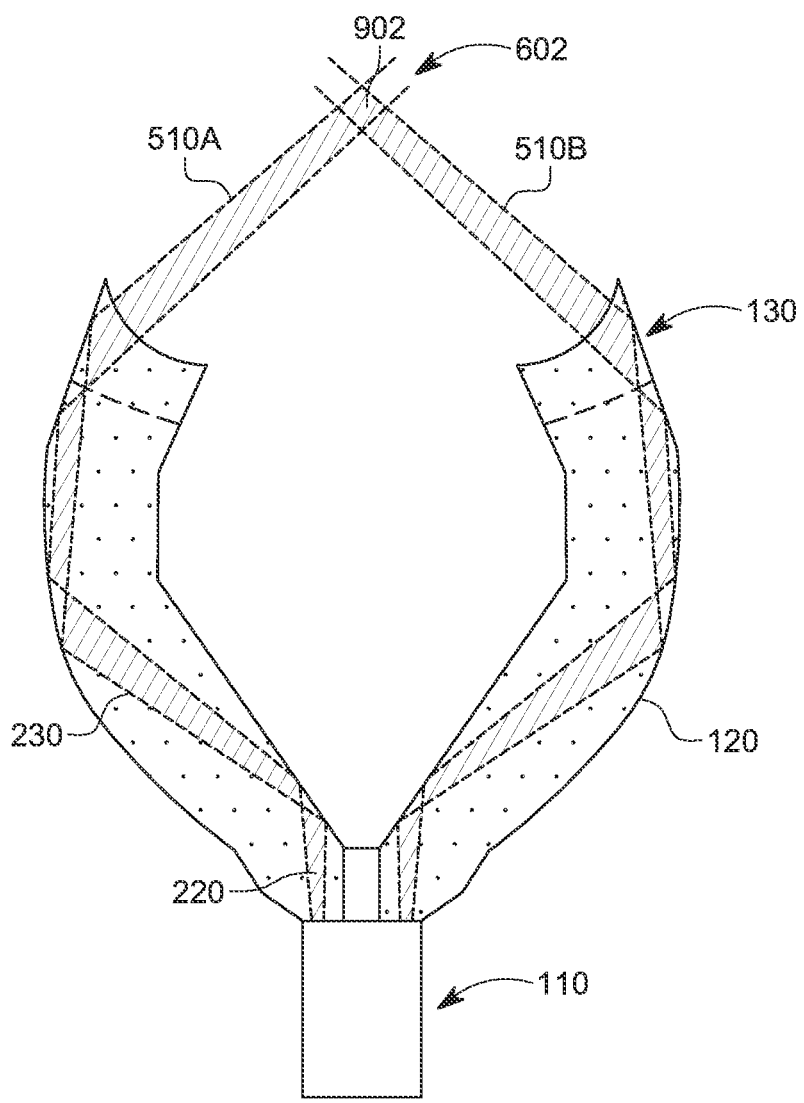
FIG. 9B shows the same modified optical microstructure with the prism region.

A third option (3) to adjust the focusing conditions of the beam 510 is to change the profile of the parabolic reflecting surface 404 of the PIC 120 to make it focusing and not collimating the second annular beam 230 at the crossing point 602, as shown in FIG. 9A. For this microstructure 900, it is possible to actually remove the AP 130 as the parabolic reflecting surface 404 of the PIC 120 provides the same functionality as the reflecting surface 502 of the AP 130, but for a relatively low NA. If a high NA is desired, the AP 130 is not removed, as illustrated in FIG. 9B. Therefore, for the embodiment illustrated in FIG. 9A, the microstructure 900 includes only the beam converter 110 and the PIC 120. Having the plural individual optical beams 510A and 510B focused (i.e., convergent and not collimated) makes the focal spot 902 smaller in size.

No matter of the number of functional parts that form the microstructure 100, the microstructure 100 is configured to assist in transforming the input gaussian beam 203, from the optical fiber 102, into a tight, high NA spot 700/800/902 that can be used for trapping microscopic particles, e.g., cells, in three dimensions.

Figure 10:
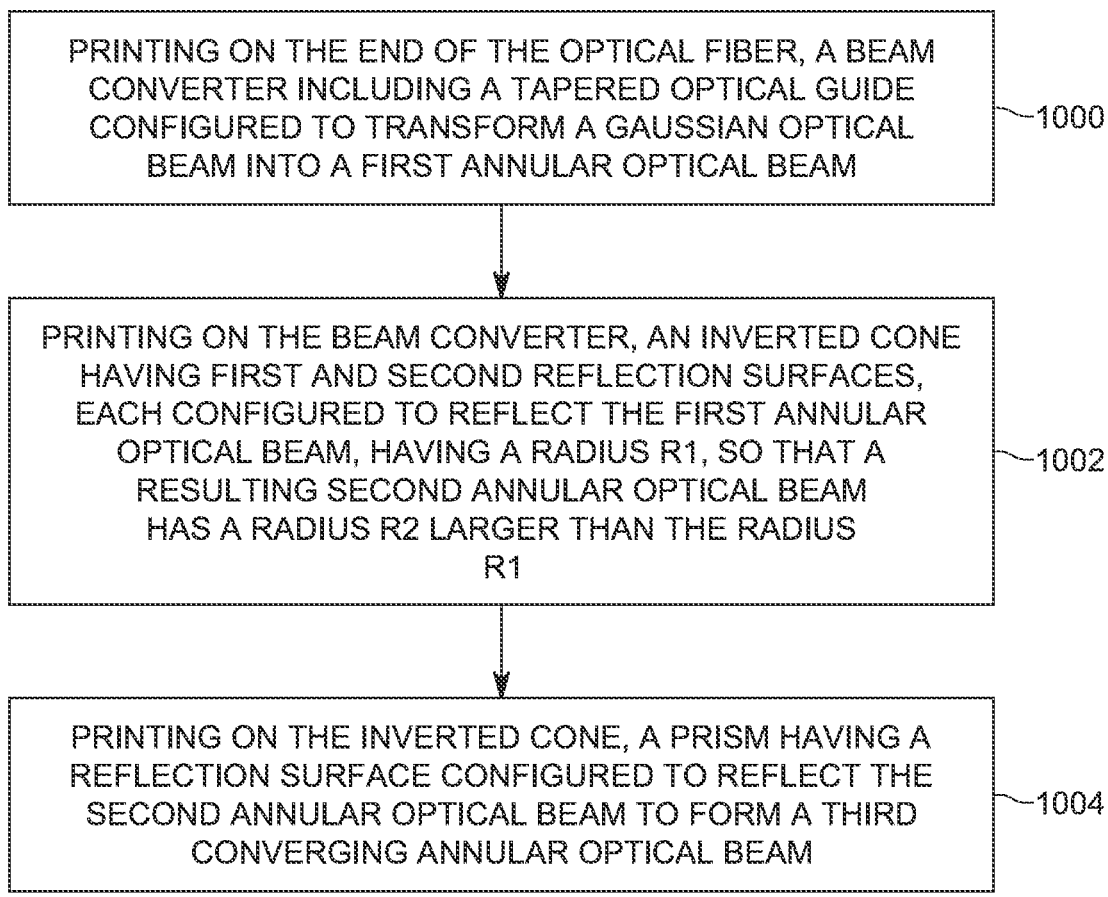
FIG. 10 is a flow chart of a method for printing the optical microstructure illustrated in the previous figures.

A method for manufacturing the optical microstructure 100 is now discussed with regard to FIG. 10. The method includes a step 1000 of printing on the end of the optical fiber 102, a beam converter 110 including a tapered optical guide 204 configured to transform a gaussian optical beam 203 into a first annular optical beam 220, a step 1002 of printing on the beam converter 110, an inverted cone 120 having first and second reflection surfaces 402, 404, each configured to reflect the first annular optical beam 220, having a radius R1, so that a resulting second annular optical beam 230 has a radius R2 larger than the radius R1, and a step 1004 of printing on the inverted cone 120, a prism 130 having a reflection surface 502 configured to reflect the second annular optical beam 230 to form a third converging annular optical beam 510. The third converging annular optical beam 510 includes plural single optical beams 510A, 510B that intersect at a given crossing point 602, outside the optical microstructure 100, and the plural single optical beams 510A, 510B form an optical trapping.

In one application, the step of printing on the end of the optical fiber 102, includes matching a diameter of an end of the tapered optical guide 204 to a diameter of a core of the optical fiber. The optical microstructure may be printed directly on the end of the optical fiber, or as a standalone device and then attached to the end of the optical fiber. The various parts of the optical microstructure can be printed continuously, so that no physical border is formed between them, i.e., the optical microstructure is a single, integral structure. However, in one embodiment, each part may be printed separately and then the parts are attached to each other with an optical neutral glue. Other methods for making the optical microstructure may be used instead of the printing method.

The disclosed embodiments provide an optical microstructure that can be attached to a traditional optical fiber to obtain fiber optic tweezers. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Ashkin, A. Acceleration and Trapping of Particles by Radiation Pressure. *Phys Rev Lett* 24, 156-& (1970).
[2] Liu, Z. H., Guo, C. K., Yang, J. & Yuan, L. B. Tapered fiber optical tweezers for microscopic particle trapping: fabrication and application. *Opt Express* 14, 12510-12516 (2006).
[3] Yuan, L. B., Liu, Z. H., Yang, J. & Guan, C. Y. Twin-core fiber optical tweezers. *Opt Express* 16, 4559-4566 (2008).
[4] Zhang, Y., Liu, Z. H., Yang, J. & Yuan, L. B. Four-Core Optical Fiber Micro-Hand. *J Lightwave Technol* 30, 1487-1491 (2012).
[5] Liberale, C. et al. Miniaturized all-fibre probe for three-dimensional optical trapping and manipulation. *Nat Photonics* 1, 723-727 (2007).
[6] Zhang, Y., Liu, Z., Yang, J. & Yuan, L. A non-contact single optical fiber multi-optical tweezers probe: Design and fabrication. *Opt Commun* 285, 4068-4071 (2012).
[7] Liberale, C. et al. Integrated microfluidic device for single-cell trapping and spectroscopy. *Sci Rep-Uk* 3 (2013).
[8] Zhao, X. T., Zhao, N., Shi, Y., Xin, H. B. & Li, B. J. Optical Fiber Tweezers: A Versatile Tool for Optical Trapping and Manipulation. *Micromachines Basel* 11 (2020).
[9] Huntington, S. T. et al. A fractal-based fibre for ultra-high throughput optical probes. *Opt Express* 15, 2468-2475 (2007).

What is claimed is:

1. An optical microstructure configured to work with an optical fiber or a different substrate, the optical microstructure comprising:
    a beam converter including a tapered optical guide configured to transform a gaussian optical beam into a first annular optical beam;
    an inverted cone having first and second reflection surfaces, each configured to reflect the first annular optical beam, having a radius R1, so that a resulting second annular optical beam has a radius R2 larger than the radius R1; and
    a prism having a reflection surface configured to reflect the second annular optical beam to form a third converging annular optical beam,
    wherein the third converging annular optical beam includes plural single optical beams that intersect at a given crossing point, outside the optical microstructure, and wherein the plural single optical beams form an optical trap.

2. The optical microstructure of claim 1, wherein the beam converter further comprises:
plural channels distributed into concentric circles around the tapered optical guide,
wherein the plural channels include a material that is different from a material of the beam converter.

3. The optical microstructure of claim 2, wherein corresponding diameters of the plural channels increase along a radial direction of the beam converter.

4. The optical microstructure of claim 1, wherein a first end of the tapered optical guide is circular, and a second end is annular.

5. The optical microstructure of claim 1, wherein the tapered optical guide extends along a longitudinal axis of the beam converter and is formed from plural discrete parts.

6. The optical microstructure of claim 1, wherein the first reflection surface of the inverted cone has a planar profile and the second reflection surface has a parabolic profile.

7. The optical microstructure of claim 1, wherein the inverted cone is configured to collimate or focus the second annular optical beam.

8. The optical microstructure of claim 1, wherein a central portion of the inverted cone is empty.

9. The optical microstructure of claim 1, wherein the reflection surface of the prism has a planar profile, and an output end has a flat shape.

10. The optical microstructure of claim 1, wherein the reflection surface of the prism has a planar profile, and an output end has a curved shape to act as a lens for the third converging annular optical beam.

11. The optical microstructure of claim 1, wherein the reflection surface of the prism has a curved profile to focus each of the plural single optical beams.

12. An optical microstructure configured to work with an optical fiber or a different substrate, the optical microstructure comprising:
a beam converter including a tapered optical guide configured to transform a gaussian optical beam into a first annular optical beam; and
an inverted cone having first and second reflection surfaces, each configured to reflect the first annular optical beam, having a radius R1, so that a resulting second annular optical beam has a radius R2 larger than the radius R1,
wherein the second annular optical beam includes plural single optical beams that intersect at a given crossing point, outside the optical microstructure, and
wherein the plural single optical beams form an optical trap.

13. The optical microstructure of claim 12, wherein the first reflection surface has a planar profile and the second reflection surface has a parabolic profile, and wherein the parabolic profile is selected to converge each of the plural single optical beams of the second annular optical beam.

14. A fiber optical tweezers for manipulating one or more particles, the fiber optical tweezers comprising:
an optical fiber having an end that outputs a gaussian optical beam; and
an optical microstructure attached to the end of the optical fiber and configured to receive the gaussian optical beam and generate plural single individual optical beams that act as tweezers,
wherein the optical microstructure includes,
a beam converter that transforms the gaussian optical beam into a first annular optical beam,
an inverted cone that increase a radius of the first annular optical beam to form a second annular optical beam, and
a prism that transforms the second annular optical beam into a third converging annular optical beam,
wherein the third converging annular optical beam includes the plural single optical beams that intersect at a given crossing point, outside the optical microstructure, and
wherein the plural single optical beams form an optical trap.

15. The fiber optical tweezers of claim 14, wherein the beam converter further comprises:
a tapered optical guide that receives the gaussian optical beam and outputs the first annular optical beam; and
plural channels distributed into concentric circles around the tapered optical guide,
wherein the plural channels are empty, and
wherein a first end of the tapered optical guide is circular, and a second end is annular.

16. The fiber optical tweezers of claim 14, wherein a first reflection surface of the inverted cone has a planar profile and a second reflection surface has a parabolic profile, and the first and second reflection surfaces increase the radius of the second annular optical beam.

17. The fiber optical tweezers of claim 14, wherein the inverted cone is configured to collimate the second annular optical beam.

18. The fiber optical tweezers of claim 14, wherein a reflection surface of the prism reflects the second annular optical beam to form the third converging annular optical beam, and the reflection surface has a planar profile, and an output end has (1) a flat shape or (2) a curved shape to act as a lens for the third converging annular optical beam.

19. A method for printing an optical microstructure on an end of an optical fiber for forming a fiber optical tweezers, the method comprising:
printing on the end of the optical fiber, a beam converter including a tapered optical guide configured to transform a gaussian optical beam into a first annular optical beam;
printing on the beam converter, an inverted cone having first and second reflection surfaces, each configured to reflect the first annular optical beam, having a radius R1, so that a resulting second annular optical beam has a radius R2 larger than the radius R1; and
printing on the inverted cone, a prism having a reflection surface configured to reflect the second annular optical beam to form a third converging annular optical beam,
wherein the third converging annular optical beam includes plural single optical beams that intersect at a given crossing point, outside the optical microstructure, and
wherein the plural single optical beams form an optical trapping.

20. The method of claim 19, wherein the step of printing on the end of the optical fiber, includes matching a diameter of an end of the tapered optical guide to a diameter of a core of the optical fiber.

* * * * *